United States Patent
Hedman

(10) Patent No.: US 6,820,512 B2
(45) Date of Patent: Nov. 23, 2004

(54) MOTOR VEHICLE GEARBOX

(75) Inventor: Anders Hedman, Marstrand (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/220,432

(22) PCT Filed: Feb. 28, 2001

(86) PCT No.: PCT/SE01/00427
§ 371 (c)(1),
(2), (4) Date: Dec. 18, 2002

(87) PCT Pub. No.: WO01/65144
PCT Pub. Date: Sep. 7, 2001

(65) Prior Publication Data
US 2003/0145671 A1 Aug. 7, 2003

(30) Foreign Application Priority Data
Mar. 1, 2000 (SE) ................................. 0000672

(51) Int. Cl.⁷ .................................................. F16H 3/08
(52) U.S. Cl. .............................. 74/330; 74/331; 74/343
(58) Field of Search .......................... 74/329, 330, 331, 74/333, 340, 343

(56) References Cited

U.S. PATENT DOCUMENTS

| | | | |
|---|---|---|---|
| 4,226,135 A | * 10/1980 | Winter | 74/330 |
| 4,461,188 A | * 7/1984 | Fisher | 74/330 |
| 4,727,764 A | 3/1988 | Klaue | |
| 4,738,149 A | * 4/1988 | Janiszewski | 74/330 |
| 4,876,907 A | 10/1989 | Andersson et al. | |
| 5,150,628 A | * 9/1992 | Alfredsson | 74/330 |
| 5,823,051 A | * 10/1998 | Hall, III | 74/331 X |

FOREIGN PATENT DOCUMENTS

| | | | |
|---|---|---|---|
| GB | 2103316 | * | 2/1983 |
| WO | 97/33103 | | 9/1997 |

* cited by examiner

Primary Examiner—Ha Ho
(74) Attorney, Agent, or Firm—Young & Thompson

(57) ABSTRACT

Motor vehicle gearbox with two concentrically mounted input shafts, each driving an individual layshaft, having gears in engagement with gears on an output shaft. One layshaft has a central synchronization device, via which the layshaft which is driveably coupled to the momentarily non-driven input shaft, can be accelerated up to a rotational speed chosen by the selected gear speed. The central synchronization device has a friction clutch and two synchronization gears of different diameter, the gear of smaller diameter being widened relative to the other and being lockable to the shaft by an engagement sleeve, so that drive torque can be transmitted via the synchronization gear. The second layshaft is releasable by an engagement device, whereby torque can be transmitted from one layshaft to the other and to the output shaft.

6 Claims, 1 Drawing Sheet

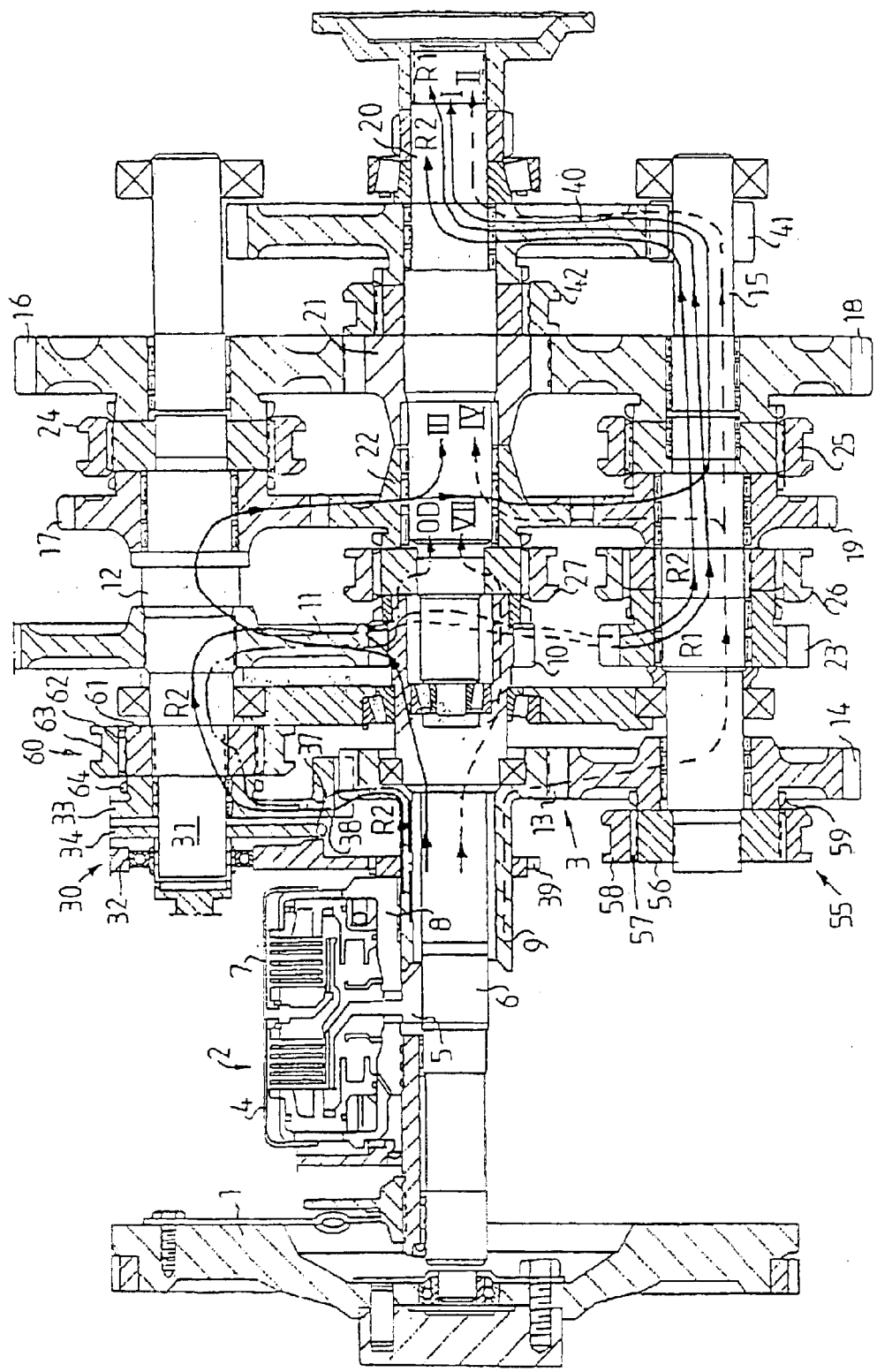

MOTOR VEHICLE GEARBOX

FIELD OF THE INVENTION

The present invention relates to a motor vehicle gearbox, comprising at least two concentrically arranged alternately driveable first and second input shafts, first and second layshafts, primary gears carried by the first input shaft and the first layshaft, said primary gears engaging each other for transmitting torque from the first input shaft to the first layshaft, primary gears carried by the second input shaft and the second layshaft, said primary gears engaging each other for transmitting torque from the second input shaft to the second layshaft, an output shaft, gears carried by the layshafts and the output shaft, said gears engaged in each other in pairs for transmitting torque from either layshaft to the output shaft and of which at least one gear in each pair is a releasable idle gear, and synchronizing means comprising firstly a pair of synchronizing gears of different diameters rotatably mounted on one of the layshafts, said gears being in driving engagement with gear rings on one input shaft, and secondly friction means, by means of which a driving connection between one synchronizing gear and the shaft can be established to adapt the rotational speed of the layshaft which is driveably coupled to the momentarily undriven input shaft, to a rotational speed determined by the selected gear speed, at least the synchronizing gear of smaller diameter being coordinated with engaging means which permits transmission of higher torque to its layshaft than what is required for said rotational speed adaption.

BACKGROUND OF THE INVENTION

A gearbox of the above stated type is previously known from SE-A-507 366. It is based on a so-called "power-shift" gearbox with a two-position central synchronization, whereby six synchronizing functions are obtained in a seven-speed gearbox with two synchronizing gears and a synchronizing clutch on one of the layshafts. It is further developed in that one of the synchronizing gears is made so that it can also be used for torque transmission to provide an additional gear speed, namely an overdrive. Practically, this can be achieved by widening one of the normally quite narrow synchronization gears and providing it with engaging means which provides a shape engagement instead of a friction engagement.

OBJECT OF THE INVENTION

The purpose of the present invention is, in a gearbox of the type described by way of introduction, to increase the number of gear ratios with the smallest possible economic investment and design work.

SUMMARY OF THE INVENTION

This is achieved according to the invention by virtue of the fact that that the primary gear of the second layshaft is coordinated with engaging means, whereby the primary gear is releasable from and lockable to its shaft, and that the primary gear is releasable from its shaft at the same time as the synchronizing gear of smaller diameter is lockable by means of its engagement means to its shaft to permit torque transmission from the second input shaft via said synchronization gear and inter-engaging gears on the first and second layshafts to the output shaft.

Merely by arranging the primary gear of the second layshaft to be releasable, which is known per se in other contexts, and coordinating this release with the engagement of the other synchronization gear, i.e. the overdrive gear, a second reverse gear is obtained with a lower gear ratio than the existing reverse gear. To do such design work, only one additional engaging means is required to provide the gearbox the gearbox shown in SE-A-507 366 with an additional gear speed.

BRIEF DESCRIPTION OF THE DRAWING

The invention will be described in more detail with reference to an example shown in the accompanying drawing, where the FIGURE shows a longitudinal section through a gearbox with seven regular gears plus overdrive and reverse gear.

DETAILED DESCRIPTION OF THE DRAWING 1 in the Figures designates an engine fly wheel, which via a multi-disk wet disk clutch, generally designated 2, drives a gearbox 3 according to the invention. The clutch 2 is a double clutch of a type known per se and therefore it does not need to be described in more detail here. The left hand clutch unit 4 seen in the FIGURE is coupled via a sleeve element 5 to a first input shaft 6 in the gearbox, while the right hand clutch unit 7 is coupled via a sleeve element 8 to a second input shaft 9 in the form of a hollow shaft mounted concentrically with the first shaft 6. The two clutch units can be alternately engaged and disengaged to alternately drive the input shafts 6 and 9. The wet disk clutch shown can be replaced by a double dry disk clutch.

The first input shaft 6 is provided with a gear ring 10, in engagement with a gear 111 which is solidly mounted on a first layshaft 12. The second input shaft 9 is made with a gear ring 13 which is in engagement with a gear 14 which is mounted on a second layshaft 15. The gear ring 13 is larger than the gear ring 10, which means that the second layshaft 15 will rotate more rapidly than the first layshaft 12 at the same input rpm for the respective input shaft.

The layshafts 12 and 15 respectively each support a pair of freely rotatably mounted gears 16, 17 and 18, 19 respectively, of which the gears 16, 18 are both in engagement with a gear 21 fixedly mounted on the output shaft 20, and the gears 17, 19 are in engagement with a gear 22 which is rotatably mounted on the output shaft and can be locked to the shaft with the aid of an engaging sleeve 27. The shafts are arranged in a V shape in order to make it possible, with the aid of an extra gear 23 on the layshaft 15, said gear engaging the gear 11 on the layshaft 12, to reverse the rotational direction of one of the layshafts for providing a reverse gear. It is also possible to reverse the rotational direction of the respective layshaft by means of a gear mounted on a separate shaft in the housing, said gear engaging the gear rings 10 and 23. This provides a freer selection of V shape and gear ratios and also permits the shafts to be placed in the same plane. The gears 16, 17, 18, 19 and 23 are lockable to their shafts with the aid of axially displaceable engaging sleeves 24, 25 and 26. A gear 40 freely rotatably mounted on the output shaft 20 engages the gear ring 41 integral with the layshaft 15 and is lockable to the shaft 20 by means of an engaging sleeve 42. By cutting the gear ring 41 directly in the layshaft 15 and arranging the gear 40 lockable to the output shaft, the need for needle bearings on the layshaft is eliminated and the gear can be made with a very small diameter, which in turn provides a higher gear ratio from the layshaft to the output shaft. With the aid of the engaging sleeve 27, the input shaft 6 and the output shaft 20 can be locked together for direct drive. All of these engaging sleeves are without individual, conventional synchronizing devices.

The first layshaft 12 is instead co-ordinated with a central synchronizing device generally designated 30. It comprises a pair of gears 32, 33 freely rotatably mounted on an extension 31 of the layshaft 12 with a clutch disk 34 therebetween. The clutch disk 34 is axially displaceable but non rotatably mounted relative to the shaft 12 by means of splines. The clutch disk is joined to operating means, not shown in more detail here, for controlling the shifting. The synchronizing gears 32, 33 have on their sides facing the disk 34 frictional surfaces 37, 38. The left hand gear 32 engages a gear ring 39 on the second input shaft 9. The gear ring 39 has a smaller diameter than the gear ring 10 on the first input shaft. The right hand synchronizing gear 33 engages the gear ring 13 on the second input shaft and here there is preferably a difference of one or two gear teeth between the synchronizing gear 33 and the driven gear 14 on the second layshaft.

For more detailed description of the synchronizing sequence reference is made to SE-A-507 366.

In order to be able to utilize the synchronizing gear 33 for torque transmission it has been widened relative to the gear 32 and coordinated with an engagement device 60 which provides a shape-bound engagement. The engagement device 60 comprises a hub 61 solidly joined to the layshaft 12. The hub 61 has external splines 62 which engage corresponding internal splines on the engagement sleeve 63. The gear 33 is provided with a ring of splines 64.

When torque is to be transmitted via the synchronization gear 33 the gear is locked to the shaft by axial displacement of the engagement sleeve 63, so that its splines engage with the splines 64 of the gear 33. The torque is now transmitted as indicated by the dash-dot OD line in the FIGURE, thereby providing an additional gear speed, an overdrive, which has a higher rpm on the output shaft 20 than on the input shaft 6.

According to the invention the primary gear 14 of the second layshaft is freely rotatably mounted on the shaft and is coordinated with an engagement device 55 which comprises a hub 56, non-rotatably joined to the layshaft 15. The hub has external splines 57 which engage corresponding internal splines on an engagement sleeve 58. The gear 14 is made with a ring of splines 59.

With the gear 33 locked on the layshaft 12 and gear 14 released from the layshaft 15, torque can be transmitted from the layshaft 12 to the layshaft 15 and from there to the output shaft 20, as marked with the line R2 in the FIGURE, thus providing a faster reverse gear, i.e. a reverse gear with a lower gear ratio than the ordinary reverse gear. The torque path for the ordinary reverse gear is marked with the line R1 in the FIGURE.

What is claimed is:

1. A motor vehicle gearbox, comprising at least two concentrically arranged alternately driveable first and second input shafts (6,9), first and second layshafts (12,15), first and second primary gears carried by the first input shaft (6) and the first layshaft (12) respectively, said first and second primary gears (10,11) engaging each other for transmitting torque from the first input shaft (6) to the first layshaft (12), third and fourth primary gears (13,14) carried by the second input shaft (9) and the second layshaft (15) respectively, said third and fourth primary gears engaging each other for transmitting torque from the second input shaft (9) to the second layshaft (15), an output shaft (20), gears (16,17,18, 19,21,22) carried by the layshafts and the output shaft, said gears being engaged in each other in pairs for transmitting torque from either layshaft to the output shaft and of which at least one gear in each pair is a releasable idler gear, and synchronizing means (30) comprising firstly a pair of synchronizing gears (32, 33) of different diameters rotatably mounted on said first layshaft, said synchronizing gears being in driving engagement with said third primary gear (13) and a gear ring (39) on said second input shaft (9), and secondly friction means (34), by means of which a driving connection between one of said synchronizing gears (32, 33) and the first layshaft (12) can be established to adapt the rotational speed of the first layshaft which is driveably coupled to a momentarily undriven input shaft, to a rotational speed determined by a selected gear speed, at least the synchronizing gear (33) of smaller diameter being coordinated with first engaging means (60) which permits transmission of higher torque to said first layshaft than what is required for a rotational speed adaption, characterized in that said fourth primary gear (14) of the second layshaft (15) is coordinated with second engaging means (55), whereby said fourth primary gear (14) is releasable from and lockable to it said second layshaft (15), and that said fourth primary gear is releasable from said second layshaft (15) at the same time as the synchronizing gear (33) of smaller diameter is lockable, by means of said first engaging means (60) to said first layshaft (12) to permit torque transmission from the second input shaft (9) via one of said synchronization gears (33) and said first and second primary gears (11,12) on the first and second layshafts (12,15) to the output shaft (20).

2. The gearbox according to claim 1, characterized in that the synchronization gear (33) of smaller diameter is coordinated with said first engaging means (60), which permits transmission of higher torques to said first layshaft (12) than the friction means (34).

3. The gearbox according to claim 1, characterized in that the synchronization gear (33) of smaller diameter engages said third primary gear (13) arranged on said second input shaft (9) and that the gear ratio between these latter gears is lower than the gear ratio between the first primary gear (10) of the first input shaft (6) and the second primary gear (11) in engagement therewith, on the first layshaft (12).

4. The gearbox according to claim 1, characterized in that the synchronizing gear (33) of smaller diameter has a gear ring of larger axial dimension than the gear ring of the second synchronization gear (32).

5. The gearbox according to claim 1, characterized in that the first engaging means (60) comprise an engaging hub (61) non-rotatably joined to the first layshaft (12), said hub, non-rotatably but axiallly displaceably carries an engagement sleeve (63) with internal engaging teeth (62), which upon displacement of the engagement sleeve in one direction are insertable into engagement with corresponding engagement teeth (64) on the synchronization gear (33) for locking it to the first layshaft (12).

6. The gearbox according to claim 2, characterized in that the synchronization gear (33) of smaller diameter engages said third primary gear (13) arranged on said second input shaft (9) and that the gear ratio between these latter gears is lower than the gear ratio between the first primary gear (10) of the first input shaft (6) and the second primary gear (11) in engagement therewith, on the first layshaft (12).

* * * * *